United States Patent
Hearn

(10) Patent No.: US 8,176,241 B2
(45) Date of Patent: May 8, 2012

(54) SYSTEM AND METHOD FOR OPTIMIZING DRAM REFRESHES IN A MULTI-CHANNEL MEMORY CONTROLLER

(75) Inventor: Alan S. Hearn, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1330 days.

(21) Appl. No.: 11/398,933

(22) Filed: Apr. 5, 2006

(65) Prior Publication Data

US 2007/0239930 A1  Oct. 11, 2007

(51) Int. Cl.
*G06F 12/00* (2006.01)
(52) U.S. Cl. .................... 711/106; 711/E12.001
(58) Field of Classification Search ............ 711/106
See application file for complete search history.

(56) References Cited

U.S. PATENT DOCUMENTS

| | | | | |
|---|---|---|---|---|
| 5,508,841 A * | 4/1996 | Lin et al. | | 359/318 |
| 5,651,131 A * | 7/1997 | Chesley | | 711/106 |
| 6,643,746 B1 * | 11/2003 | Bouquet | | 711/151 |
| 2001/0027541 A1 * | 10/2001 | Richter et al. | | 714/42 |
| 2006/0136665 A1 * | 6/2006 | Chen | | 711/114 |

* cited by examiner

*Primary Examiner* — Reginald Bragdon
*Assistant Examiner* — Larry MacKall
(74) *Attorney, Agent, or Firm* — Warren L. Franz; Wade J. Brady, III; Frederick J. Telecky, Jr.

(57) ABSTRACT

In accordance with the teachings of the present invention, a system and method for optimizing DRAM refreshes in a multi-channel memory controller are provided. In a particular embodiment, the method includes receiving, at a router in a light modulation system, a signal from one of a plurality of channels operable to read or write to a plurality of DRAM banks, the signal indicating that the channel does not need to access the plurality of DRAM banks during predetermined time period. The method also includes indicating the receipt of the signal to a refresh channel including a plurality of counters, wherein each counter is operable to track refreshes of a respective one of the plurality of DRAM banks. The method further includes receiving, from the refresh channel, an indication of one of the plurality of DRAM banks to refresh in response to the receipt of the signal, and refreshing the indicated DRAM bank.

13 Claims, 2 Drawing Sheets

US 8,176,241 B2

SYSTEM AND METHOD FOR OPTIMIZING DRAM REFRESHES IN A MULTI-CHANNEL MEMORY CONTROLLER

TECHNICAL FIELD

This invention relates generally to multi-channel memory controllers and, more particularly, to a system and method for optimizing DRAM refreshes in a multi-channel memory controller.

BACKGROUND

Dynamic random access memory ("DRAM") is a type of random access memory that stores each bit of data in a separate capacitor. As real-world capacitors are not ideal and hence leak electrons, the information stored in the DRAM eventually fades unless the capacitor charge is periodically refreshed. In a multi-channel memory controller, this periodic refresh is accomplished by dedicating some portion of the read/write cycle to refreshing the DRAM. Typically, the overhead required for this refresh is approximately 1% of the peak bandwidth. Since most DRAMs are run below their peak bandwidth, for example, approximately 80%, this refresh overhead does not represent a significant portion of the read/write cycle. However, as the DRAM is run at higher percentages of peak bandwidth, for example, approximately 95%, the time dedicated to refresh overhead becomes increasingly more expensive.

SUMMARY OF THE INVENTION

In accordance with the teachings of the present invention, a system and method for optimizing DRAM refreshes in a multi-channel memory controller are provided. In a particular embodiment, the method comprises receiving, at a router in a light modulation system, a signal from one of a plurality of channels operable to read or write to a plurality of DRAM banks, the signal indicating that the channel does not need to access the plurality of DRAM banks during predetermined time period. The method also includes indicating the receipt of the signal to a refresh channel including a plurality of counters, wherein each counter is operable to track refreshes of a respective one of the plurality of DRAM banks. The method further comprises receiving, from the refresh channel, an indication of one of the plurality of DRAM banks to refresh in response to the receipt of the signal, and refreshing the indicated DRAM bank.

A technical advantage of particular embodiments of the invention may include the ability to reduce the amount of refresh overhead required for efficient operation of the DRAM. By replacing otherwise unused cycle time (i.e., no-ops) with a refresh, particular embodiments of the present invention are able to reduce, if not eliminate, allocations of time dedicated to refreshing the DRAM. This allows the DRAM to be run at higher efficiencies without degrading performance.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF EXAMPLE EMBODIMENTS

In accordance with the teachings of the present invention, a system and method for optimizing DRAM refreshes in a multi-channel memory controller are provided. In a particular embodiment, the method comprises receiving, at a router in a light modulation system, a signal from one of a plurality of channels operable to read or write to a plurality of DRAM banks, the signal indicating that the channel does not need to access the plurality of DRAM banks during predetermined time period. The method also includes indicating the receipt of the signal to a refresh channel including a plurality of counters, wherein each counter is operable to track refreshes of a respective one of the plurality of DRAM banks. The method further comprises receiving, from the refresh channel, an indication of one of the plurality of DRAM banks to refresh in response to the receipt of the signal, and refreshing the indicated DRAM bank. By refreshing the DRAM during the time that the channel does not need to access the DRAM, particular embodiments may reduce the amount of overhead allocated to refreshing the DRAM. This allows the DRAM to be run at higher efficiencies without degrading system performance.

Figure 1:
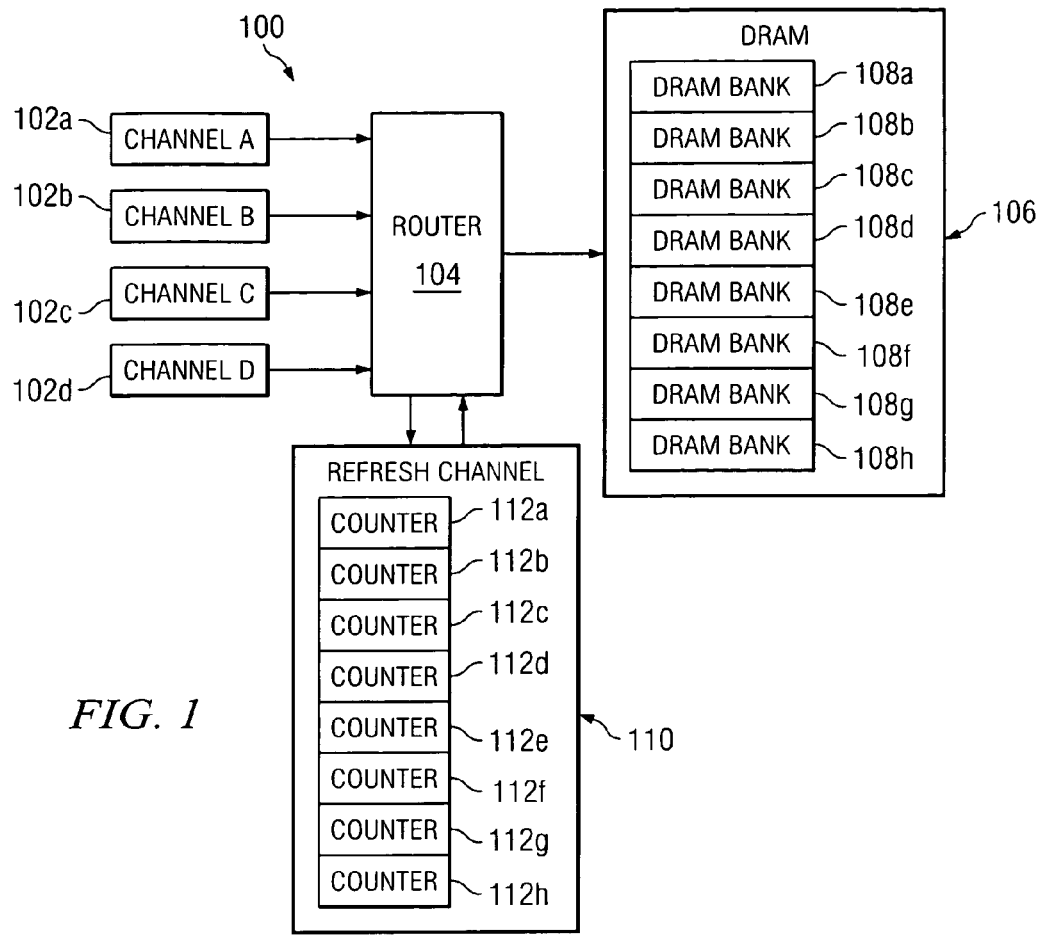
FIG. 1 illustrates a multi-channel memory controller and DRAM in accordance with a particular embodiment of the present invention.

FIG. 1 illustrates multi-channel memory system 100 in accordance with a particular embodiment of the present invention. Multi-channel memory system 100 is a memory system that may be used to store values for use in a light modulation system, such as a digital micro-mirror device ("DMD"), although memory system 100 may be suitable for use in other devices. Generally, multi-channel memory system 100 comprises a plurality of channels 102, a router 104, a DRAM 106 that comprises a plurality of DRAM banks 108, and a refresh channel 110 operable to refresh the various DRAM banks 108 of DRAM 106. Although DRAM 106 is shown as comprising eight DRAM banks 108, it should be understood that DRAM 106 may comprise any number of DRAM banks. Similarly, although FIG. 1 illustrates four channels 102, it should be understood that any number of channels 102 may be used in accordance with the teachings of the present invention.

In operation, router 104 receives requests from channels 102 to read or write to the various banks 108 of DRAM 106. Typically, these requests comprise a read or write command and the DRAM bank 108 on which to perform the operation, or a signal indicating the channel does not need to access a DRAM bank at that time (a "no-op" signal). Router 104 then routes these requests to the appropriate DRAM bank 108 based upon a round-robin time division multiplex ("TDM") scheme used to prevent, or at least reduce, stalling of DRAM 106.

Due to the latency of DRAM 106, particular embodiments of the present invention restrict system 100 from accessing the same DRAM bank 108 until at least one row cycle time ("$T_{RC}$") has elapsed. In particular embodiments of the present invention this is accomplished by restricting system 100 from accessing the same DRAM bank 108 more than once every four accesses of the DRAM 106. In particular embodiments, this is accomplished by dividing the banks 108 of DRAM 106 into four subsets. For example, DRAM 106 may be divided into four subsets comprising DRAM banks 108a and 108b, 108c and 108d, 108e and 108f, and 108g and 108h, respectively. System 100 cycles through the four subsets, allowing access to the DRAM banks 108 in each subset only during the time allocated to that subset.

Figure 2:
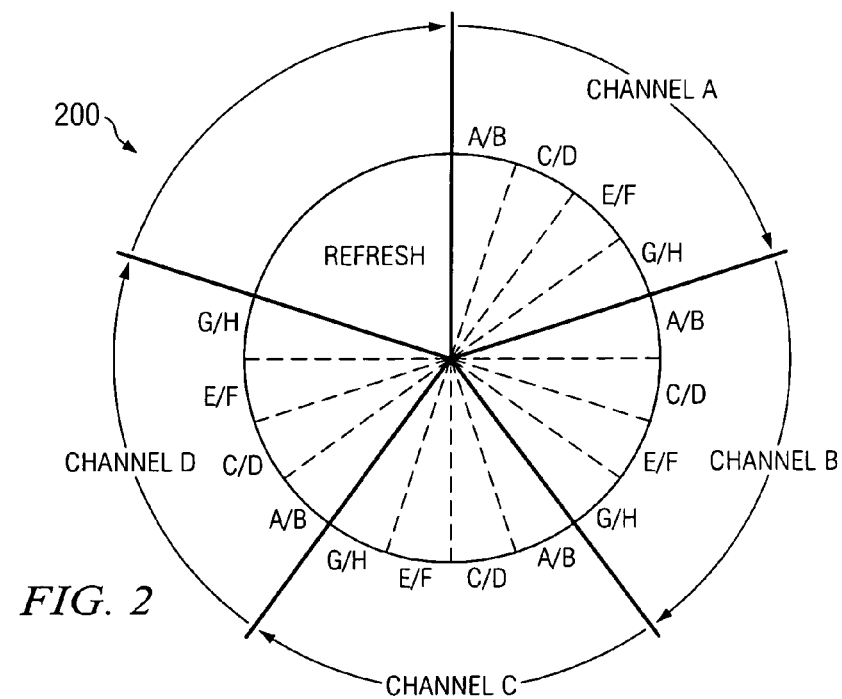
FIG. 2 illustrates a time division multiplex cycle in accordance with a particular embodiment of the present invention.

A better understanding of this concept may be had by making reference to FIG. 2, which illustrates a TDM wheel 200 in accordance with a particular embodiment of the present invention. TDM wheel 200 corresponds to one cycle of the TDM allocation scheme employed by router 104. As shown in FIG. 2, each channel 102a-d (FIG. 1) is given a portion of this cycle. This portion may be referred to as the TDM "slice" for that channel 102. Depending on the relative memory needs of the channels 102, the sizes of these TDM slices may vary between channels. Therefore, although all the TDM slices shown in FIG. 2 are of equal size, it should be understood that each channel 102 may have a different size TDM slice in accordance with the teachings of the present invention. Each TDM slice is then divided in subslots corresponding to the subsets of DRAM banks 108 (FIG. 1) discussed above. For example, the TDM slice for channel 102a is divided into four TDM subslots: one for DRAM banks 108a and 108b, one for DRAM banks 108c and 108d, one for DRAM banks 108e and 108f, and one for DRAM banks 108g and 108h. If a channel 102 wants to read from or write to a particular DRAM bank 108, it must want for the TDM subslot corresponding to that bank 108. During that TDM subslot, the channel 102 can then read from or write to the desired bank 108. However, it should be understood that only one bank 108 from the subset of banks 108 may be read from or written to during each TDM subslot. If a channel 102 wants to read from or write to both DRAM banks 108 in a particular TDM subslot, the channel 102 must use two TDM subslots to do so. In the event a channel 102 does not need to access one of the DRAM banks 108 in a particular TDM subslot, the channel 102 sends router 104 a no-op signal, indicating that the channel 102 has no operation to perform at that time. Once the TDM cycle has moved through all the subslots for channel 102a, the TDM cycle moves on to channels 102b, 102c, and 102d, and then refresh channel 110. Once the TDM cycle is complete, the process simply repeats itself.

Referring back to FIG. 1, since the banks 108 of DRAM 106 must be periodically refreshed to prevent losing the data stored in the DRAM 106, multi-channel memory system 100 also includes a dedicated refresh channel 110 that is responsible for periodically refreshing the different DRAM banks 108 of DRAM 106. To facilitate this, refresh channel 110 includes a plurality of counters 112, one for each of bank 108 in DRAM 106. For example, counter 112a corresponds to bank 108a, counter 112b corresponds to bank 108b, counter 112c corresponds to bank 108c, and so forth. Each counter 112 keeps track of the refreshes of its corresponding bank 108. Whenever a bank 108 is refreshed, the corresponding counter 112 is updated. Based upon these counters 112, refresh channel 110 can tell which DRAM banks 108 are most in need of being refreshed.

As indicated above during the discussion of FIG. 2, particular embodiments of the present invention include a TDM slice dedicated to refreshing the different banks 108 of DRAM 106. During this TDM slice, refresh channel 110 may refresh DRAM banks 108 to ensure that the banks 108 do not lose the information stored in them. In particular embodiments, this refresh TDM slice may account for approximately 1% of the overall memory bandwidth. As DRAM 106 is run at increasingly higher efficiencies, this portion of the memory bandwidth becomes more valuable for actually accessing DRAM 106, rather than merely refreshing the DRAM 106. Therefore, particular embodiments of the present invention may substitute DRAM refreshes in place of the no-ops received from channels 102. Rather than letting the TDM subslots corresponding to those no-ops go unused, these embodiments instead use that portion of the TDM cycle to refresh DRAM 106. In particular embodiments, this may reduce, or even eliminate the need for a TDM slice dedicated to refreshing DRAM 106.

Figure 3:
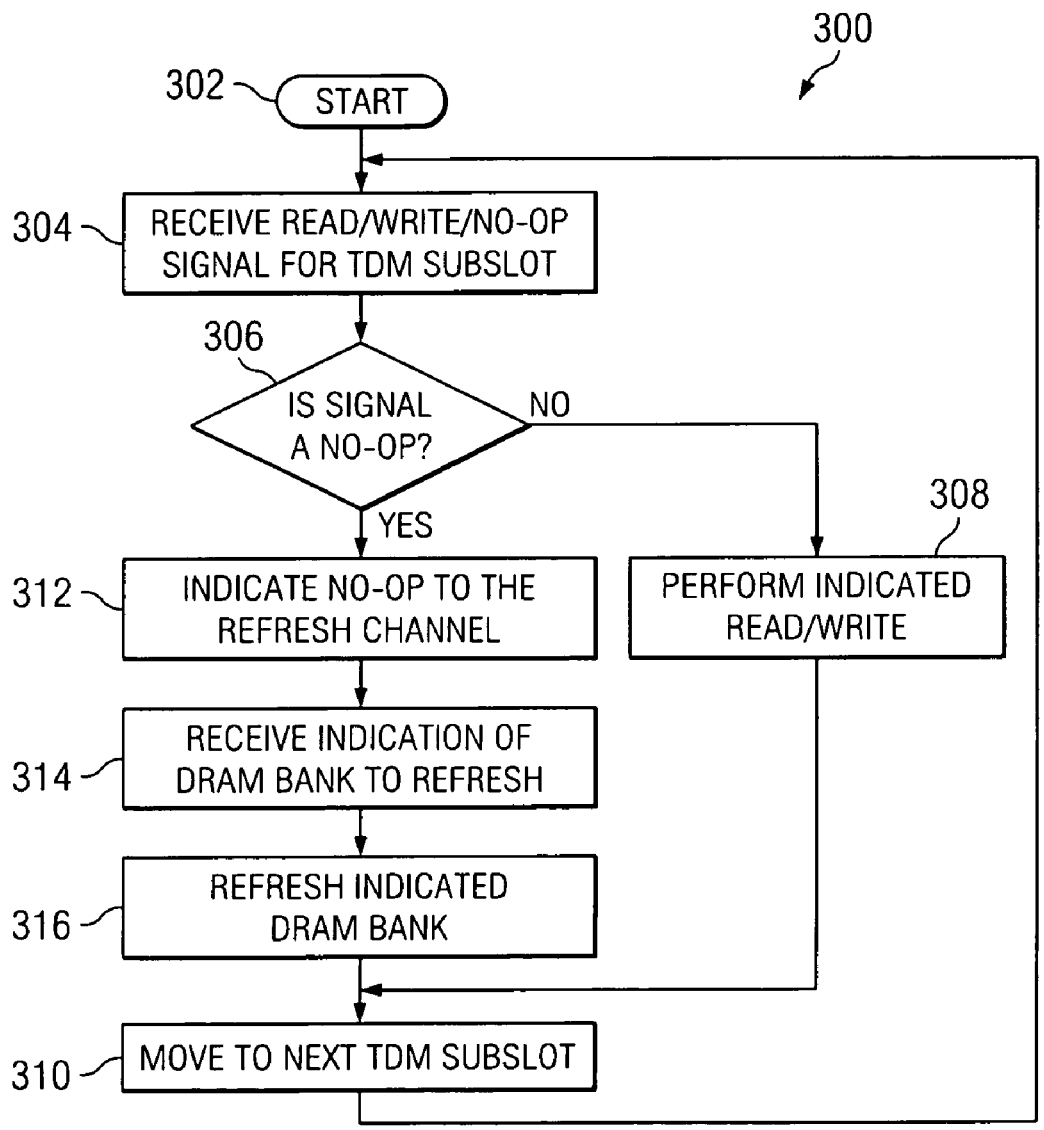
FIG. 3 illustrates a flow chart of a method of optimizing DRAM refreshes in accordance with a particular embodiment of the present invention.

FIG. 3 illustrates a flowchart 300 of a method of substituting DRAM refreshes for no-ops in accordance with a particular embodiment of the present invention. After flowchart 300 begins at step 302, router 104 (FIG. 1) receives a read, write, or no-op signal from a channel 102 (FIG. 1) at step 304 for that particular subslot of the TDM cycle. For example, if this subslot corresponds to DRAM banks 108a and 108b, the channel may read from or write to bank 108a or 108b, or if the channel does not need to access either bank, the channel may simply send router 104 a no-op signal.

At step 306, router 104 determines whether this signal is a read or write command or a no-op signal. If the signal is a read or write command, router 104 forwards the request to DRAM 106 (FIG. 1) which performs the indicated read or write at step 308. However, if the signal is a no-op, at step 312 router 104 indicates to refresh channel 110 (FIG. 1) that a no-op signal has been received. Refresh channel 110 then indicates, at step 314, which bank 108 (FIG. 1) in the subset of DRAM banks 108 corresponding to that TDM subslot to refresh. In particular embodiments, the determination of which DRAM bank 108 to refresh is made by checking the counters 112 (FIG. 1) corresponding to the DRAM banks 108 for that TDM subslot to see which DRAM bank 108 has gone the longest time without a refresh. Refresh channel 110 then indicates to router 104 the particular bank 108 that needs to be refreshed. After the indicated refresh or read/write operation has been performed, the cycle moves to the next TDM slice or subslot at step 310, and receives a new read/write/no-op signal at step 304, where the process begins again.

By replacing TDM cycle time that would have otherwise been unused (due to the no-op) with a DRAM refresh, particular embodiments of the present invention are able to reduce the size of the TDM slice that must be dedicated to refreshing the DRAM or even eliminate it. This reduction or elimination allows the DRAM to be run at higher efficiencies without degrading system performance.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for refresh optimization in a multi-channel memory controller, comprising:

receiving, at a router in a light modulation system, a signal from one of a plurality of channels operable to read or write to a plurality of DRAM banks, the signal indicating that the channel does not need to access the plurality of DRAM banks during a predetermined time period;

indicating the receipt of the signal to a refresh channel comprising a plurality of counters, each counter operable to track refreshes of a respective one of the plurality of DRAM banks;

receiving from the refresh channel an indication of one of the plurality of DRAM banks to refresh in response to the receipt of the signal; and refreshing the DRAM bank indicated by the refresh channel.

2. The method of claim 1, wherein the light modulation system comprises a digital micro-mirror device.

3. A method for optimizing DRAM refreshes in a multi-channel memory controller, comprising:

receiving a signal from one of a plurality of channels operable to read or write to a plurality of DRAM banks, the signal indicating that the channel does not need to access the plurality of DRAM banks during predetermined time period;

indicating the receipt of the signal to a refresh channel comprising a plurality of counters, each counter operable to track refreshes of a respective one of the plurality of DRAM banks;

receiving from the refresh channel an indication of one of the plurality of DRAM banks to refresh in response to the receipt of the signal; and refreshing one of the plurality of DRAM banks in response to the receipt of the signal.

4. The method of claim 3, further comprising:

updating the counter corresponding to the DRAM bank refreshed in response to the receipt of the signal.

5. The method of claim 3, wherein receiving a signal from one of the plurality of channels comprises receiving, at a router operable to receive and route read and write commands from the plurality channels to the plurality of DRAM banks, a signal from one of the plurality of channels.

6. The method of claim 5, wherein the router is operable to receive and route read and write commands from the plurality of channels to the plurality of DRAM banks based upon a time division multiplex scheme.

7. The method of claim 3, wherein receiving a signal from one of a plurality of channels comprises receiving a signal in place of a command to read or write to a subset of the plurality of DRAM banks; and wherein refreshing one of the plurality of DRAM banks in response to the receipt of the signal comprises one of the subset of DRAM banks.

8. The method of claim 7, wherein refreshing one of the plurality of DRAM banks in response to the receipt of the signal comprises refreshing the least recently refreshed DRAM bank of the subset of DRAM banks.

9. A system for optimizing DRAM refreshes in a multi-channel memory controller, comprising:

a router operable to receive and route read and write commands from a plurality of channels to a plurality of DRAM banks, and further operable to receive a signal from one of the plurality of channels, the signal indicating that the channel does not need to access the plurality of DRAM banks during a predetermined time period, and refresh one of the plurality of DRAM banks in response to the receipt of the signal; and a refresh channel operable to track refreshes of the plurality of DRAM banks, receive an indication of the receipt of the signal by the router, and indicate to the router one of the plurality of DRAM banks to refresh in response to the receipt of the signal.

10. The system of claim 9, wherein the refresh channel comprises a plurality of counters operable to track refreshes of the plurality of DRAM banks, each counter corresponding to a respective one of the DRAM banks.

11. The system of claim 9, wherein the router is operable to receive and route read and write commands from a plurality of channels to a plurality of DRAM banks based upon a time division multiplex scheme.

12. The system of claim 11, wherein the router is operable to receive the signal from one of the plurality of channels in place of a command to read or write to a subset of the plurality of DRAM banks and refresh one of the subset of DRAM banks in response to the receipt of the signal.

13. The system of claim 12, wherein the router is operable to refresh the least recently refreshed one of the subset of DRAM banks in response to the receipt of the signal.

* * * * *